United States Patent [19]

Di Stefano

[11] Patent Number: 4,846,763
[45] Date of Patent: Jul. 11, 1989

[54] UNIVERSAL JOINT WITH IMPROVED BEARING AND SEAL CONSTRUCTION

[76] Inventor: Alfonso Di Stefano, 1413 Wayburn Rd., Grosse Pointe Park, Mich. 48230

[21] Appl. No.: 76,407

[22] Filed: Jul. 22, 1987

[51] Int. Cl.⁴ .............................................. F16D 3/26
[52] U.S. Cl. ..................................... 464/136; 464/139
[58] Field of Search ............... 403/57, 58; 464/106, 464/112, 136, 139

[56] References Cited

U.S. PATENT DOCUMENTS

| | | |
|---|---|---|
| 97,575 | 12/1869 | Wheeler . |
| 105,696 | 7/1870 | Keller . |
| 1,386,735 | 8/1921 | Schaefer . |
| 1,407,617 | 2/1922 | Ziegler . |
| 1,705,731 | 3/1929 | Hufferd ............... 464/139 |
| 2,207,981 | 7/1940 | Greiner ............... 464/112 |
| 2,672,740 | 3/1954 | Dunn . |
| 2,997,864 | 8/1961 | Rueb .................. 464/112 |
| 3,012,420 | 12/1961 | Schaedler . |
| 3,300,258 | 1/1967 | Kompanek, Jr. et al. ...... 464/136 X |

FOREIGN PATENT DOCUMENTS

| | | | |
|---|---|---|---|
| 1200466 | 12/1959 | France ............... 464/136 |
| 517426 | 7/1957 | Italy ................. 464/136 |
| 585629 | 2/1947 | United Kingdom ... 403/57 |
| 680213 | 10/1952 | United Kingdom ... 464/132 |
| 2129524 | 5/1984 | United Kingdom ... 464/112 |

*Primary Examiner*—Daniel P. Stodola
*Attorney, Agent, or Firm*—Cullen, Sloman, Grauer, Scott & Rutherford

[57] ABSTRACT

A universal joint has an output shaft mounting a clevis which is projected into a yoke upon a drive shaft. A cylindrical roller connector is positioned within a socket in the clevis. A transverse pivot post upon the yoke extends through the roller connector for a pivotal connection with the roller connector upon a first axis. Transverse assembly pins project axially outward centrally of the roller connector into the clevis for pivotal movement of the clevis upon a second axis at right angles to the first axis.

5 Claims, 3 Drawing Sheets

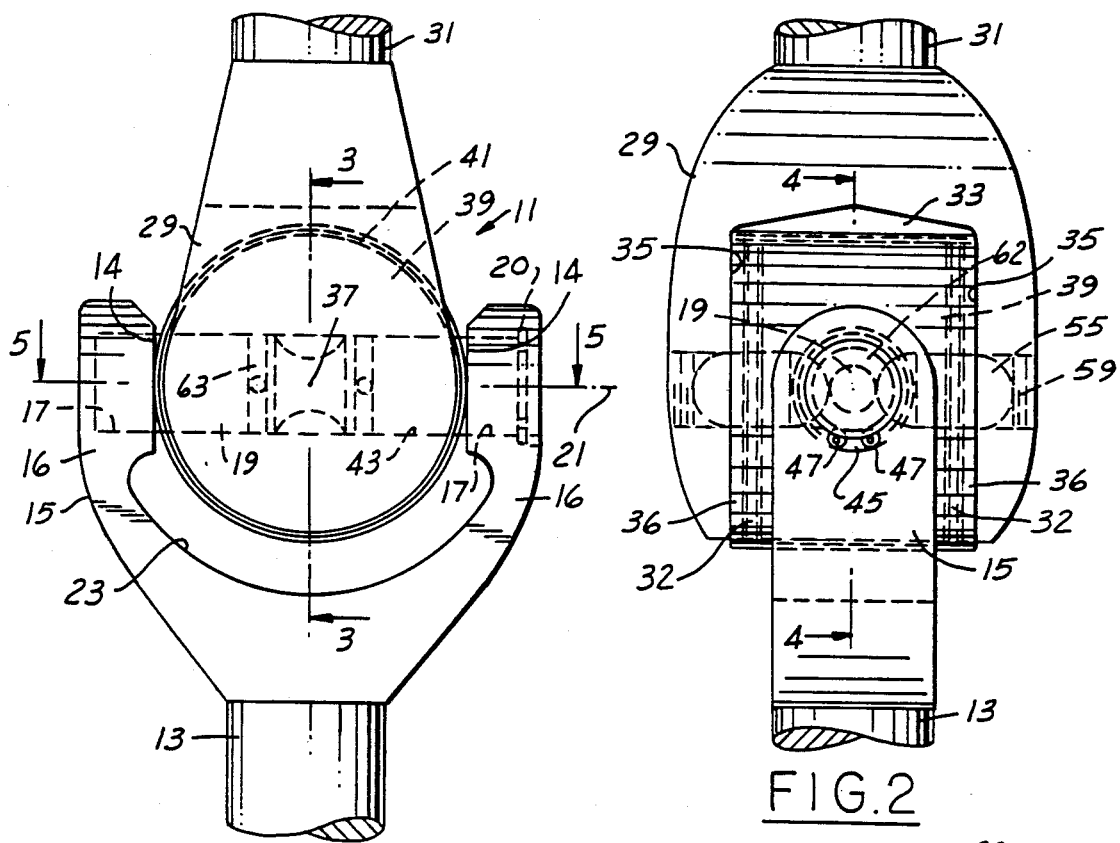
FIG.1
FIG.2
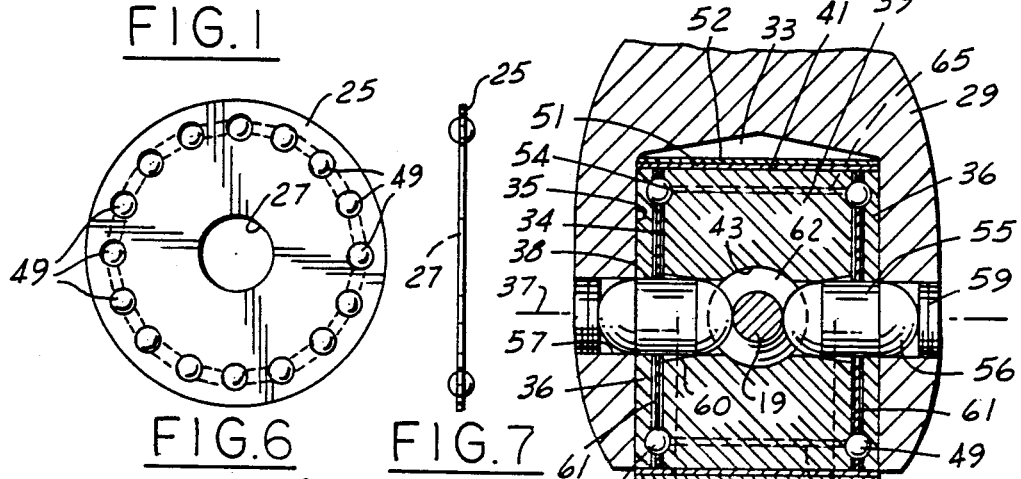
FIG.6
FIG.7
FIG.3
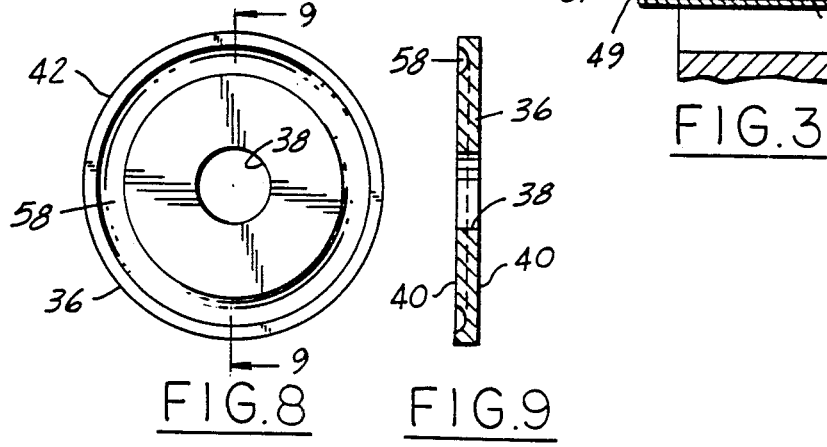
FIG.8
FIG.9

UNIVERSAL JOINT WITH IMPROVED BEARING AND SEAL CONSTRUCTION

FIELD OF THE INVENTION

The present invention relates to a universal joint and more particularly to a universal joint having an improved bearing and seal construction.

BACKGROUND OF THE INVENTION

Previously, in universal joint constructions, there has been difficulty in providing for proper connections between the respective parts of a universal joint so that it is capable of relative pivotal movements in right angularly related planes and wherein frictional wear has resulted in the use of conventional pivot pins between the respective parts due to lack of proper lubrication or lack of proper bearing surfaces.

Previously, universal joints require frequent lubrication to remain efficient and to prevent wear and increase the life of the universal joint. Previously, the external portions of the universal joint have been exposed to atmosphere, moisture and dirt, requiring disassembly and cleaning from time to time.

THE PRIOR ART

Illustrative of universal joints are one or more of the following U.S. Pat. Nos.:
 95,575, S. Wheeler, Dec. 7, 1869.
 105,696, M. A. Keller, July 26, 1870.
 1,386,735, C. T. Schaefer, Aug. 9, 1921.
 1,407,617, W. M. Ziegler, Feb. 21, 1922.
 2,672,740, G. E. Dunn, Mar. 23, 1954.
 3,012,420, R. J. Schaedler, Dec. 12, 1961.

SUMMARY OF THE INVENTION

An important feature of the present invention is to provide an improved universal joint which includes an output shaft mounting a clevis, a drive shaft generally aligned with the output shaft and mounting a yoke having a recess receiving the clevis wherein a cylindrical roller connector is positioned within the clevis pivotally connected on a first axis to the yoke and pivotally connected upon a second axis at right angles thereto to the clevis.

Another features is to provide within the clevis a socket having opposed side walls within which is nested a roller connector which provides the universal connection, namely right angular pivotal connections respectively between the yoke on the drive shaft and the clevis on the output shaft and wherein the present cylindrical roller is interposed between the yoke and clevis.

Still another features is to provide an improved bearing assembly for receiving the radially directed posts mounted upon the yoke and which projects through the cylindrical roller whereby the yoke is adapted for rotative movements upon a first axis, as for example a vertical axis, with greatly reduced friction.

A further feature includes mounting of the cylindrical roller within the clevis upon an axis at right angles of the first axis, as for example a horizontal axis, and wherein radial opposed assembly pins project outwardly from the center of the roller connector and into corresponding apertures within the clevis whereby the clevis is rotatable upon the second axis relative to the roller connector.

A still further feature is to provide for the roller connector a means for taking up the torsional load and stresses between the drive shaft and output shaft, during functioning of the universal joint. The load is transmitted between the roller connector and the clevis, and an improved bearing assembly takes upon the major torsional loads limiting the strain upon the assembly pins.

Another feature is to provide for the cylindrical roller improved ball bearing assemblies upon opposite ends thereof adjacent its end faces, and in cooperative registry with the corresponding end faces of the clevis and wherein torsional loads between the drive shaft and the output shaft are distributed over the surfaces of the cylindrical roller connector and the corresponding ball bearing assemblies between the roller connector and the clevis.

Still another feature is to provide an improved permanent seal for the lubricated ball bearings which are employed at opposite end faces of the roller connector to exclude dirt and moisture from the ball bearings and to provide an efficient connector member between the yoke pivotally mounted thereon upon a first axis and the clevis pivotally connected thereto upon a second axis.

These and other features and objects can be seen from the following specification and claims, in conjunction with the appended drawings.

THE DRAWINGS

FIG. 1 is a fragmentary front elevational view of the present universal joint.

FIG. 2 is a fragmentary right side view thereof.

FIG. 3 is a fragmentary section taken in the direction of arrows 3—3 of FIG. 1.

FIG. 6 is a side elevational view of a ball bearing support disc and ball bearings thereon.

FIG. 7 is an end view thereof.

FIG. 8 is a front view of one of the hardened discs shown in FIG. 3.

FIG. 9 is a section taken in the direction of arrows 9—9 of FIG. 8.

Figure 4:
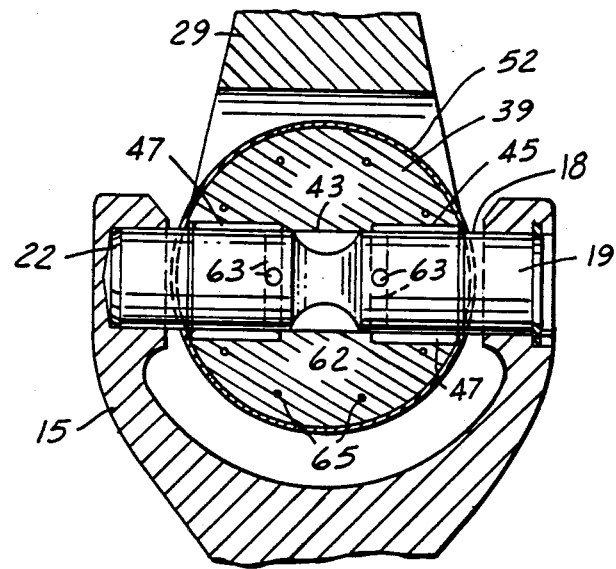
FIG. 4 is a fragmentary section taken in the direction of arrows 4—4 of FIG. 2.

It will be understood that the above drawings illustrate merely preferred embodiments of the invention, and that other embodiments are contemplated within the scope of the claims thereafter set forth.

DETAILED DESCRIPTION OF AN EMBODIMENT OF THE INVENTION

The present universal joint 11, shown in FIG. 1, includes input shaft 13, fragmentarily shown, and the connected yoke 15 having one end terminating in two spaced walls 16 having parallel opposed planar surfaces 14 and coaxially aligned bores 17 therethrough. Pivot post 19 has a generally cylindrical surface 18 which spans walls 16 and has ends anchored within coaxially aligned bores 17 by lock ring 20.

Pivot rod 19 is arranged upon a first axis 21. Yoke 15 includes an arcuate socket 23 within which is positioned clevis 29, FIGS. 1 and 2, upon one end of output shaft 31, fragmentarily shown.

Within clevis 29, and in general alignment with output shaft 31, is connector recess 33 which includes a pair of opposed parallel spaced side walls 35 against which bear the opposed hardened disc 36, FIGS. 3. The discs 36 have a circular outer perimeter 42, two parallel flat end faces 40 and a central aperture 38 to receive assembly pins 55 having a cylindrical body 64, and spherical ends 56 arranged upon a transverse second axis 37. Block connector 39 includes a cylindrical surface 41, flat end walls 34, and radial bore 43 adapted to receive transverse pivot rod 19 mounted upon yoke 15. Anchored within adjacent counterbores 45, FIG. 4, within block connector 39, are aligned needle bearings 47 adapted to cooperatively receive and journal rod 19 which span yoke 15. Pivot rod 19 at one end has an annular taper 22.

The load-absorbing ball bearing assemblies 49 are mounted upon ball retainer discs 25, FIG. 6, and are arranged upon the opposite flat sides of block connector 39. The assemblies are enclosed by hardened discs 36 arranged within opposite ends of the cylindrical grease seal 51 and seal cover 52 which surround block connector 39, FIG. 3.

Figure 5:
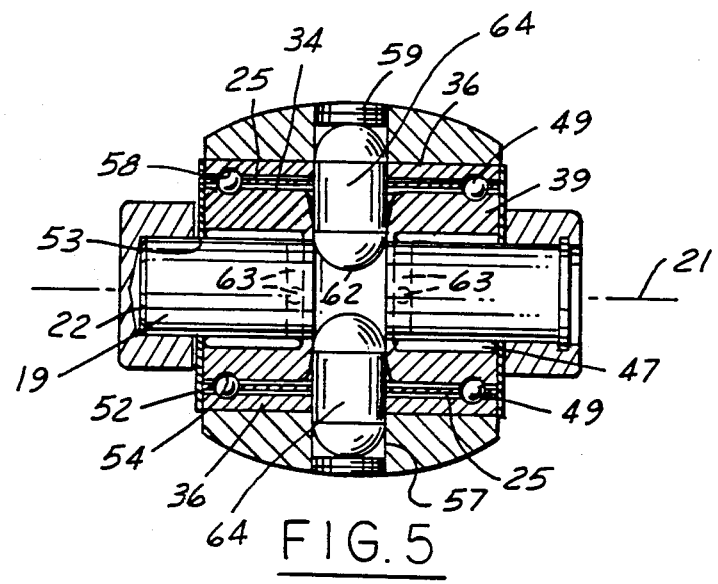
FIG. 5 is a plan section taken in the direction of arrows 5—5 of FIG. 1.

As shown in FIG. 5, upon opposite sides of grease seal cover 52, are a pair of opposed clearance apertures 53 adapted to receive pivot post 19 upon yoke 15, which projects through block connector 39 upon axis 21.

The respective ball bearings 49, as mounted upon the corresponding discs 25, are nested within annular grooves 54 upon opposite flat surfaces 34 of block connector 39. The ball bearings are also nested within corresponding annular grooves 58 in discs 36, FIG. 9. The annular grooves 54 in the block connector 39 mate with the annular grooves 58 in the corresponding discs 36 to form ball bearing tracks 32 to retain the ball bearings 49. Ball bearings are interposed between discs 36 and the exterior surfaces of block connector 39. A series of spaced axial lubrication bores 65 extend through block connector 39 interconnecting annular ball grooves 54. Grease lubrication provided for ball bearings 49 is permanently sealed within the universal joint by the grease sleeve 51 and sleeve cover 52 and the corresponding closure disc 36 at its opposite ends.

Arranged upon opposite sides of block connector 39, upon its central axis 37, are a pair of opposed assembly pins 55 with spherical ends 56, which extend through corresponding apertures 27 in the ball bearing discs 25, extend through discs 36 and are nested within corresponding axial diverging apertures 60 within block connector 39. The inner spherical ends 56 of said pins retainingly nest within an annular groove 62 in pivot pin 19, intermediate its ends, in operative engagement with said pivot pin.

The outer ends of assembly pins 55 extend into corresponding coaxially aligned bores 57 within clevis 29 and are retained therein by threaded plugs 59, FIG. 3. Radial lubricant chambers 61, between block connector 39 and discs 36, provide lubrication for pins 55 and pivot rod 19.

Referring to the drawings, FIGS. 1 and 2, output shaft 31 is adapted for rotative movements about is pivot axis 37, approximately 45° both sides of center, providing an included angle of 90° relative to yoke 15. Yoke 15, in view of pivot axis 21 located at right angles to axis 37, is adapted for pivotal movements in a horizontal plane through an arc up to 180°. By the construction provided for in the present universal joint, there is constant velocity between the respective drive shaft 13 and output shaft 31.

The cylindrical grease seal 51 and seal cover 52 are closed by the corresponding discs 36 which are arranged upon opposite ends of cylindrical block connector 39 for enclosing the corresponding ball bearings 49 and their respective support discs 25. The ball bearings 49 are permanently lubricated. The right angularly-related intersecting bores 63 through pivot rod 19 provide lubrication from ball bearings 49 to needle bearings 47, FIG. 4.

An important advantage of the arrangement of the ball bearings 49 with respect to the end faces of block connector 39 is that torsional stress and loads between the respective shafts 13 and 31 are absorbed by the corresponding sets of ball bearings 49 arranged upon opposite sides of block connector 39 rather than just by the assembly pins 55 which provide for the pivot mounting of clevis 29 about second axis 37.

By this construction there is less wear upon the respective parts. The grease seal keeps dirt and moisture from the interior of the ball bearings 49 so that the complete assembly of the universal joint 11 lasts longer. There is through the present cylindrical connector 39 good stress distribution between the drive and driven shafts 13 and 31 respectively and the corresponding yoke 15 and clevis 29.

Figure 10:
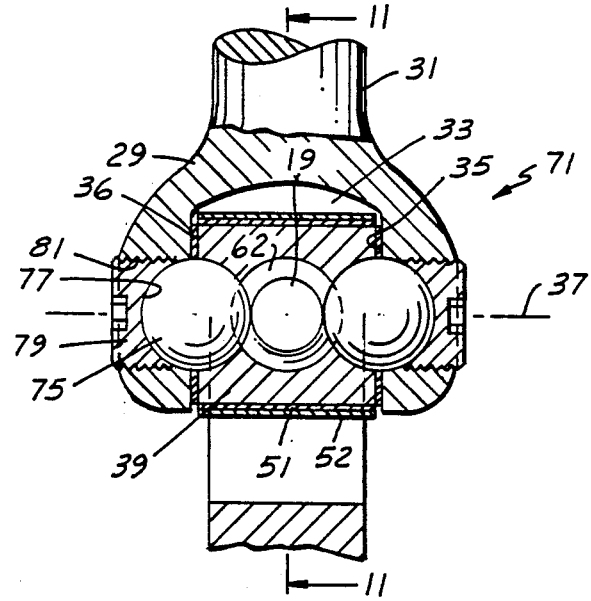
FIG. 10 is a fragmentary partly sectioned view of a modified universal joint.
Figure 11:
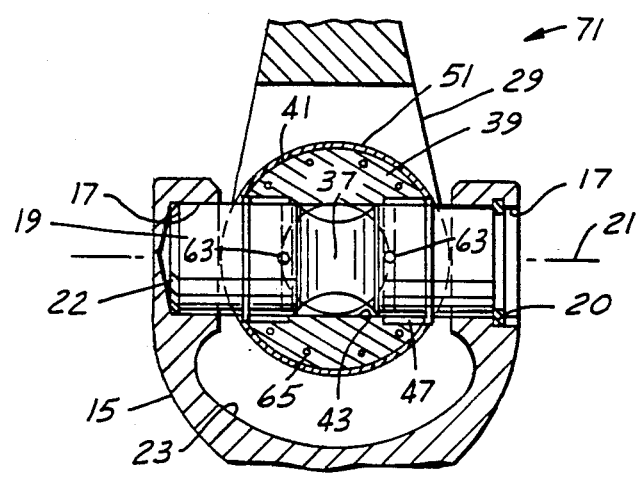
FIG. 11 is a fragmentary section taken in the direction of arrows 11—11 of FIG. 10.

A modified universal joint is shown in FIGS. 10 and 11 wherein similar parts are similarly numbered as above described and their description is not repeated.

The primary change in the construction is the change of the form and assembly of the corresponding transverse assembly pins 55 of FIG. 3 are replaced by the spherical members or balls 75.

The modified universal joint generally shown at 71 includes within opposite ends of the cylindrical roller connector 39 a pair of opposed spaced spherically shaped sockets 73 adapted to receive the corresponding hardened balls 75. Said balls project outwardly along axis 37 into corresponding spherical sockets 77 within the adjustable Allen screws or set screws 79 which are threaded into the opposed bores 81 across clevis 29.

In the assembly shown in FIGS. 10 and 11, corresponding inner surfaces of the balls 75 nest within the annular recess 62 intermediate the ends of pivot pin 19 in operative retaining engagement with said pivot pin.

Instead of assembly pins 55 shown in FIG. 3 to provide for a pivotal connection between the block connector 39 and clevis 29 there are provided the spherically shaped member 75 of hardened steel or the like in the nature of balls arranged upon the transverse axis 37 whereby the clevis 29 is adapted for pivotal movements about axis 37 with respect to the yoke 15. Construction of the cylindrical block connector 39 is the same as above described with respect to the drawings FIGS. 1-5. The oil passages and lubrication connections are the same and their description is not repeated.

Having described my Invention reference should now be had to the following claims.

I claim:

1. A universal joint comprising:
   (A) a clevis having one end operably connected to an output shaft and an opposite end terminating in two spaced walls, said walls having,
      (a) generally parallel opposed planar surfaces,
      (b) coaxially aligned bores therethrough generally perpendicular to said planar surfaces of said walls;
   (B) a block connector having, (a) a cylindrical surface having opposite flat end walls, (b) a first axis extending radially through said block connector and generally parallel to and intermediate said block connector's end walls, (c) a second axis extending through and generally perpendicular to said block connector end walls, said second axis generally perpendicular to and intersecting said first axis, (d) a radial bore therethrough coaxial with said first axis, (e) axial diverging apertures extending into said flat end walls coaxial with said second axis, (f) an annular groove in said block connector's end walls, said annular groove encircling the outer perimeter of said axial diverging apertures, (g) adjacent counterbores having an internal diameter greater than said radial bore, extending into the cylindrical surface of said block connector coaxial with said first axis, said block connector positioned between parallel opposed planar surfaces of said clevis wherein said clevis bores are coaxially aligned with said second axis, said block connector end walls spaced from said clevis planar surfaces;

(C) a pair of hardened discs having, (a) a circular outer perimeter and two generally parallel flat end faces, (b) a central bore therethrough generally perpendicular to said end faces, (c) an annular groove in one end face of each said hardened disc, said annular groove encircling said hardened disc's central bore, said hardened discs interposed between said block connector end walls and said clevis opposed planar surfaces, said hardened disc's central bores coaxially aligned with said clevis bores, and said hardened disc's annular groove and said block connector's annular groove forming a ball bearing track;

(D) a plurality of ball bearings, rotatably supported in said ball bearing tracks, to transmit the torsional forces between said hardened discs and said block connector;

(E) a pair of assembly pins having inner ends anchored within said block connectors axial diverging apertures and outer ends extending through said hardened disc's central bores and into said clevis bores;

(F) a pair of threaded plugs, threadedly received in said clevis bores, retainingly engaging said assembly pins;

(G) a yoke having one end operably connected to an input shaft and an opposite end terminating in two spaced walls, said walls having, (a) generally parallel opposed planar surfaces, (b) coaxially aligned bores therethrough generally perpendicular to planar surfaces of spaced walls, said yoke walls straddling said block connector wherein said yoke bores coaxially align with said block connector's first axis;

(H) a pivot post having a generally cylindrical exterior surface, said pivot post, (a) located within said block connector's radial bore, (b) having opposed ends extending beyond said block connector's radial bore and into adjacent bores in said yoke walls, (c) having an annular recess intermediate its ends, said assembly pins' inner ends nested within said pivot post's annular recess in operative engagement therewith; and (I) a plurality of needle bearings, snugly interposed between said block connector's adjacent counter bores and said pivot post, said needle bearings transmitting torsional forces between said pivot post and said yoke.

2. The universal joint of claim 1, wherein said assembly pins have a generally cylindrically shaped outer body with spherically shaped ends.

3. The universal joint of claim 1, wherein said assembly pins have a generally spherically shaped outer body.

4. A universal joint comprising:

(A) a clevis including one end operably connected to an output shaft and an opposite end terminating in two spaced walls;

(B) a block connector having, (a) a cylindrical surface having opposite flat end walls, said block connector positioned between said clevis walls such that said block connector end walls face said clevis walls, (b) a first axis extending radially through said block connector, (c) a second axis extending longitudinally through said block connector and perpendicularly intersecting said first axis, (d) a plurality of spaced axial lubrication bores therethrough, said bores communicating between said end walls wherein lubrication flow is conducted between said end walls, (C) a first connecting means for rotatably coupling and supporting said block connector between said clevis walls wherein said block connector rotates, with respect to said clevis, freely about said second axis;

(D) a yoke including one end operably connected to an input shaft and an opposite end terminating in two spaced walls, said yoke walls straddling said cylindrical surface of said block connector;

(E) a second connecting means for rotatably coupling and supporting said block connector between said yoke walls wherein said block connector rotates with respect to said yoke freely about said first axis; and (F) a cylindrical grease seal positioned between said clevis walls and said yoke walls, said cylindrical grease seal snugly surrounding the cylindrical surface of said connector block and surrounding said first and second connecting means.

5. The universal joint of claim 4, further comprising (A) a grease seal cover snugly surrounding said cylindrical grease seal, said grease seal cover firmly fixing said cylindrical grease seal in place to prevent any movement of said cylindrical grease seal when said block connector rotates.

* * * * *